United States Patent
Clegg

(10) Patent No.: US 8,953,491 B2
(45) Date of Patent: Feb. 10, 2015

(54) SYSTEM AND METHOD FOR PROVIDING WIRELESS NETWORK CONFIGURATION INFORMATION

(75) Inventor: Michael Clegg, Campbell, CA (US)

(73) Assignee: Netgear, Inc., San Jose, CA (US)

( * ) Notice: Subject to any disclaimer, the term of this patent is extended or adjusted under 35 U.S.C. 154(b) by 173 days.

(21) Appl. No.: 13/593,729

(22) Filed: Aug. 24, 2012

(65) Prior Publication Data

US 2014/0056171 A1  Feb. 27, 2014

(51) Int. Cl.
*H04W 4/00* (2009.01)
*H04B 5/00* (2006.01)
*H04W 84/18* (2009.01)

(52) U.S. Cl.
CPC .............. *H04W 4/008* (2013.01); *H04W 84/18* (2013.01); *H04B 5/00* (2013.01)
USPC .......................................... 370/254; 370/338

(58) Field of Classification Search
CPC ......... H04B 7/185; H04B 5/00; H04W 4/008; H04W 12/06; H04W 84/18
USPC ................................................. 370/254, 338
See application file for complete search history.

(56) References Cited

U.S. PATENT DOCUMENTS

| | | | |
|---|---|---|---|
| 7,793,108 B2* | 9/2010 | Narayanaswami et al. ... | 713/184 |
| 8,215,541 B2* | 7/2012 | Bucher et al. ................. | 235/375 |
| 2002/0032028 A1* | 3/2002 | Kaupe ........................... | 455/427 |
| 2010/0283584 A1* | 11/2010 | McAllister .................... | 340/10.1 |
| 2012/0037700 A1* | 2/2012 | Walji et al. .................... | 235/385 |
| 2012/0240191 A1* | 9/2012 | Husney et al. ................... | 726/3 |
| 2013/0223279 A1* | 8/2013 | Tinnakornsrisuphap et al. ............................ | 370/254 |
| 2013/0286889 A1* | 10/2013 | Cherian et al. ................ | 370/254 |
| 2013/0311602 A1* | 11/2013 | Rosenblatt et al. ........... | 709/217 |
| 2014/0024310 A1* | 1/2014 | Dua .............................. | 455/41.1 |
| 2014/0067440 A1* | 3/2014 | Stewart ........................... | 705/5 |

FOREIGN PATENT DOCUMENTS

| | | |
|---|---|---|
| EP | 2 364 043 A1 | 9/2011 |
| WO | 2009/026000 A1 | 2/2009 |
| WO | 2013/032483 A1 | 3/2013 |

OTHER PUBLICATIONS

British Search Report dated Jan. 27, 2014 for British Patent Application Serial No. GB1315147.7.

* cited by examiner

*Primary Examiner* — Min Jung
(74) *Attorney, Agent, or Firm* — Boyle Fredrickson, S.C.

(57) ABSTRACT

A portable computing device for configuring wireless network settings based on received network configuration information includes an input device configured to receive wireless network information from a network device independent of whether the portable computing device is connected to a wireless network that is implemented by the network device and a network configuration application for configuring one or more wireless network settings to initiate wireless network communication through the network device based on the received network information. The network configuration application is configured to facilitate communication of the received wireless network information to a client device. The network information may include a security key and may be entered into a client device either manually after being displayed on the portable computing device or by being transmitted to client device.

19 Claims, 3 Drawing Sheets

SYSTEM AND METHOD FOR PROVIDING WIRELESS NETWORK CONFIGURATION INFORMATION

CROSS-REFERENCE TO RELATED APPLICATIONS

None.

FIELD OF INVENTION

This invention generally relates to the field of wireless network security and, more particularly, to a system and method for displaying wireless network configuration information in a secure form on a first wireless network component for communication to a second wireless network component.

BACKGROUND OF THE INVENTION

The increasing portability of computing devices has also increased the demand for wireless communication networks by a wide range of users of various levels of sophistication. The portable computing devices increasingly depend on connection to a wireless network to provide the functionality desired by users. Wireless networks are increasingly prevalent, being used both for home and business networking needs.

However, wireless networks are associated with a number of unique security issues. For example, since any user with a networking receiver could detect and communicate with the network resulting in unauthorized use of network resources or even gaining access to sensitive information communicated by or stored on devices on the network. Accordingly, wireless networks typically include one or more of a wide variety of security protocols, such as Wired Equivalency Privacy (WEP) and/or Wi-Fi Protected Access (WPA).

The security protocols are implemented by and configured in a network device that may be hub and/or gateway such as a wireless router or a wireless access point. Using a configuration interface to such a network device, an administrator sets network information, such as the security parameters. These settings include, for example, user access settings, firewall settings, access limit settings, wireless network settings, communication protocols, network type, IP settings, subnet settings, etc. The administrator can further set a wireless security key in the network device that restricts access to that device to client devices having the same key. Client devices may, for example, be desk-top or laptop computers, tablets, gaming systems, e-readers, televisions, etc. After the security key is set in a router or other network device, the key must be entered into each included client device prior to allowing that client device to access the wireless network.

The security key is typically a relatively lengthy character string, most typically an alpha-numeric character string, selected by the administrator. The most secure type of wireless network key is one that consists of a randomly-generated series of letters and numbers. However, the network key is, by design, difficult to remember. Users often write the security key on a note or make a screen shot of the device's configuration page displaying the security key, but such documents are easily destroyed or misplaced. Conversely, leaving them in an easy-to-find location increases the risk of compromising the network's security.

A lost or forgotten wireless network key can be a problem, particularly on a network with multiple client devices, each of which may be accessed by multiple users. For example, resetting a security key for even a single router or other network device in a home or small office situation requires locating the original paperwork for the router to determine the proper reset procedure and thereafter resetting each client device. The resetting procedure requires that the network security key be re-entered in each client device. When the network includes a large number end users or client devices, this can become an especially time-consuming process.

It is known to use a QR reader on, for example, a smartphone to connect to a broadband router. However, the user often must reacquire the security information from the back of the security device, which can be difficult if (as is often the case) the security device is located in a relatively dark, difficult to access location and/or access to the back of the security device is hindered by cables and the like. In addition, the resulting information is only displayed. There is no mechanism for transmitting it to another device.

Further, security keys often need to be handwritten for transport to another device for the purpose of configuring the other device to communicate using the wireless network. Handwriting security keys increases security risk, introduces the possibility of transcription errors, etc. One example requiring transportation of a security key includes configuration of a network ready large screen television that cannot be positioned and/or transported to within proximity of the network device or computer displaying networking information.

What is needed is a system and method for easily communicating wireless network information including, for example, a security key from a network device to one or more client devices for communication to at least one additional client device. What is further needed is such a system and method configured to maintain the confidentiality of the wireless security key.

SUMMARY

According to one embodiment of the invention, a portable computing device for configuring wireless network settings based on received network configuration information includes an input device configured to receive wireless network information from a network device independent of whether the portable computing device is connected to a wireless network that is implemented by the network device and a network configuration application for configuring one or more wireless network settings to initiate wireless network communication through the network device based on the received network information. The network configuration application is configured to facilitate communication of the received wireless network information to a client device.

In one embodiment, the input device may include a camera with imbedded QR code interpretation software or other de-encryption software. In another embodiment, the input device may be a near field communication transceiver, and the network configuration application may be configured to transmit the received wireless network information to a client computing device using the near field communication transceiver. The network configuration application may also be configured to receive a network configuration confirmation from at least one of the network device and the client device based on the transmittal of the wireless network information to the client device.

In yet another embodiment, the network configuration application is configured to facilitate communication of the received wireless network information by displaying a wireless security key on a display of the portable computing device. The network configuration application may further be configured to delete the wireless security key from the display and from a memory of the portable computing device based on expiration of a timer.

According to another embodiment of the invention, a computer-implemented method, implemented by an application stored in non-transitory memory of a portable computing device, is used for configuring wireless network settings based on received network configuration information. The method includes the steps of 1) receiving wireless network information from a network device independent of whether or not the portable computing device is connected to a wireless network implemented by the network device, 2) configuring one or more wireless network settings to initiate wireless network communication through the network device based on the received network information, and 3) transmitting the received wireless network information to a client device using the near field communication transceiver.

According to another embodiment of the invention, a portable computing device is used for configuring wireless network settings based on received network configuration information. The device may include a code reader configured to receive a QR code or other encrypted code displayed on a network device using a camera of the portable computing device, the code including an encrypted wireless security key and a network configuration application for configuring one or more wireless network settings. The network configuration application may also be configured to display a user interface for configuring one or more wireless network settings of the network device based on the received code and transmit the received wireless network information to a client device using the near field communication transceiver.

Other features and advantages of the invention will become apparent to those skilled in the art upon review of the following detailed description and drawings in which like numerals are used to designate like features.

Figure 1:
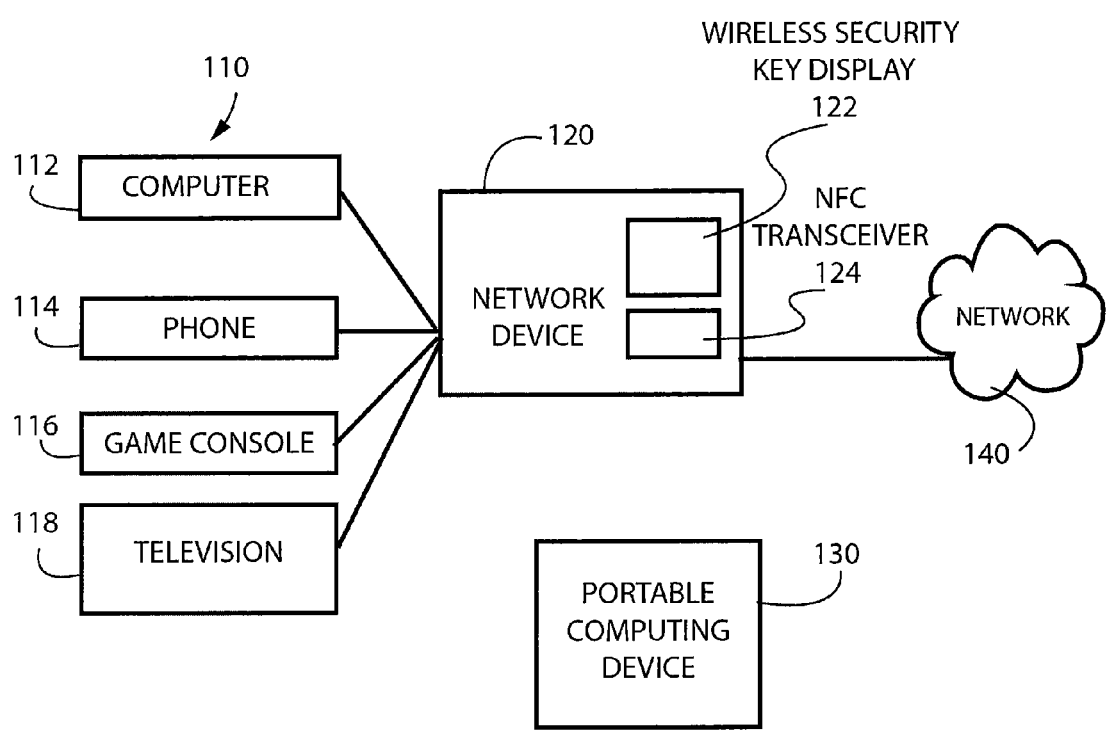
FIG. 1 schematically illustrates a networking environment for securely promulgating wireless network configuration information, according to an exemplary embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Referring now to FIG. 1, a networking environment 100 for securely promulgating wireless security key or other wireless network configuration information for an internal network 110 implemented by a network device 120 is shown, according to an exemplary embodiment. The wireless network key may be promulgated using an encrypted wireless security key display 122 on the network device 120.

Internal network 110 of this embodiment is a local area network (LAN) configured to convey information between an external network such as the Internet and one or more client devices in relatively close proximity to each other, such as within a home, school, office building, etc. The client devices may, for example include a personal computing device 112 such as a desktop computer, a laptop computer, a tablet, etc, a smartphone 114, a game console 116, and/or a television computing device 118. It should be understood that although FIG. 1 shows specific client devices, these are merely provided as examples. Any or all of these or other client devices could be present in a given internal network. Internal network 110 may further include one or more additional network communication devices to provide intercommunication between devices on the network and communication with network device 120.

Communication to, from, and between the client devices on internal network 110 is provided by the network device 120. The link between devices 112-118 and network device 120 may be a wired connection, such as an Ethernet cable, or a wireless connection, such as Wi-Fi. Devices 112-118 may also be configured for intercommunication, for example using the Bluetooth communication protocol.

Network device 120 may be any device configured to manage the flow of data to, from, and/or between client devices on internal network 110 and/or with an external network 140. Functionality described herein as being associated with network appliance may be implemented using one or more devices. For example, network device 120 may be configured to include a router in communication with a network switch, either of which can be configured to perform some or all of the functions described herein. Network device 120 may further be implemented using a plurality of network devices in communication with each other, such as a wireless access point in communication with a gateway router.

Network device 120 is configured to forward information, such as data packets, between the two computer networks 110 and 140 and/or between client devices 112-118. Where network device 120 is a router, when a data packet is received from either internal network 110 or external network 140, device (router) 120 reads address information in the packet to determine the packet's ultimate destination. In a packet-switched network, a "router" is a device which receives packets on one or more input interfaces and which outputs those packets on one of a plurality of output interfaces so as to move those packets within the network from a source device to a destination device. Each packet also includes header information which indicates the destination device in either internal network 110 or external network 140. The router includes routing information, which associates an output interface with information about the destination device, such as one or more of the client devices 112-118. The router can also perform other operations on packets, such as rewriting the packets' headers according to their routing protocol, or re-encapsulating the packets from a first routing protocol to a second routing protocol.

The packet headers may further include a wireless security key, and device 120 may further read the security key information to determine whether the device sending the packet is authorized to communicate through device 120. Each client device on network 120 can be configured to encrypt transmitted data packets using, for example, a 256 bit security key. The security key may, for example, be a string of 64 hexadecimal digits, or as a passphrase of 8 to 63 printable ASCII characters. Alternatively, the wireless security key may be any type of security or pairing key, for example a password, a VPN security key, a Bluetooth or DECT pairing code, etc.

Communication of the security key to the client's device may be implemented by a display 22. The security key and/or other networking information may be displayed on the network drive in an encrypted or coded format such that the security key is not easily discernible by a person viewing the display 122. For example, wireless security key display 122 may be a printed barcode, such as clear text, a QR code, or a UPC label, affixed as a label to the network device 120.

In an alternative embodiment, display 122 may be a dynamic display configured to display wireless security key information provided by a processor of network device 120, such as an LCD display, an active matrix display, etc. Advantageously, where display 122 is a dynamic display, display 122 may be configured to only display the wireless security key based on a received PIN number communicated to the network device 120 or based on a signal from the network device 120 processor. The key may alternatively only be displayed, for example, only upon receipt of a control signal from an external system, such as an administrator computing system. Further, the information displayed on display 122 may also be dynamic, such as a time stamped security key, a security key specific to a client device being configured, etc. Network device 120 may be configured to periodically update the security key, customize the security key to a particular client computing device, etc.

Instead of or in addition to displaying the security key, the display may be configured to display wireless network configuration information identifying one or more attributes of the network device 120, such as network type, security settings, IP settings, subnet settings, etc. Display 122 may be configured such that a client computing device, receiving the information displayed by the display 122, receives all of the information needed to communicate through network device 120.

Portable computing device 120 is configured to include components typically associated with computing devices such as a processor, memory, a display, one or more input devices, one or more output devices, etc. Portable computing device 130 is portable such that it may be carried and used in close proximity of the network device 120 to receive the wireless security key from the network device 120. It may, for example, comprise a tablet computer, a smartphone, or a laptop computer. It includes an input device acting as a bar code reader, such as an integrated camera, for receiving the security key and/or other network information from the network device 120. For example, where the barcode is a QR code, the integrated camera can receive a 2-dimensional digital image and then digitally analyze the image. The digital analysis locates three distinctive squares at the corners of the image, and normalizes image size, orientation, and angle of viewing. The small dots are then converted to binary numbers and validity checked with an error-correcting code. The binary number may then be analyzed to determine the security key integrated into the QR code. Portable computing device 130 may be used as a security key transport device to facilitate configuration of client devices as discussed in further detail below with reference to FIGS. 2-3.

Alternatively, portable computing device 130 may be configured to receive the wireless network information from network device 120 using a wired or direct connection. For example, portable computing device 130 may be plugged directly into network device 120 using an ethernet cable. According to an alternative example, a USB device may be used to transfer the wireless network information from network device 122 portable computing device 130.

Network device 120 may be a gateway device that is the exclusive communication channel between internal network 110 and external network 140. Accordingly, all content provided to or from the internal network 110 can be monitored using the network device 120 to confirm that the sending computing device is authorized to communication through the network device 120.

External network 140 may be a wide area telecommunication network (WAN) covering a broad area, such as the Internet. External network 140 may be connected to network device 120 using a wired or wireless connection. For example, a router network device 120 may be connected to a high-bandwidth connection such as a cable modem, a Digital Subscriber Line (DSL) modem, or an Integrated Services Digital Network (ISDN) connection to send and receive data with systems through external network 140.

Figure 2:
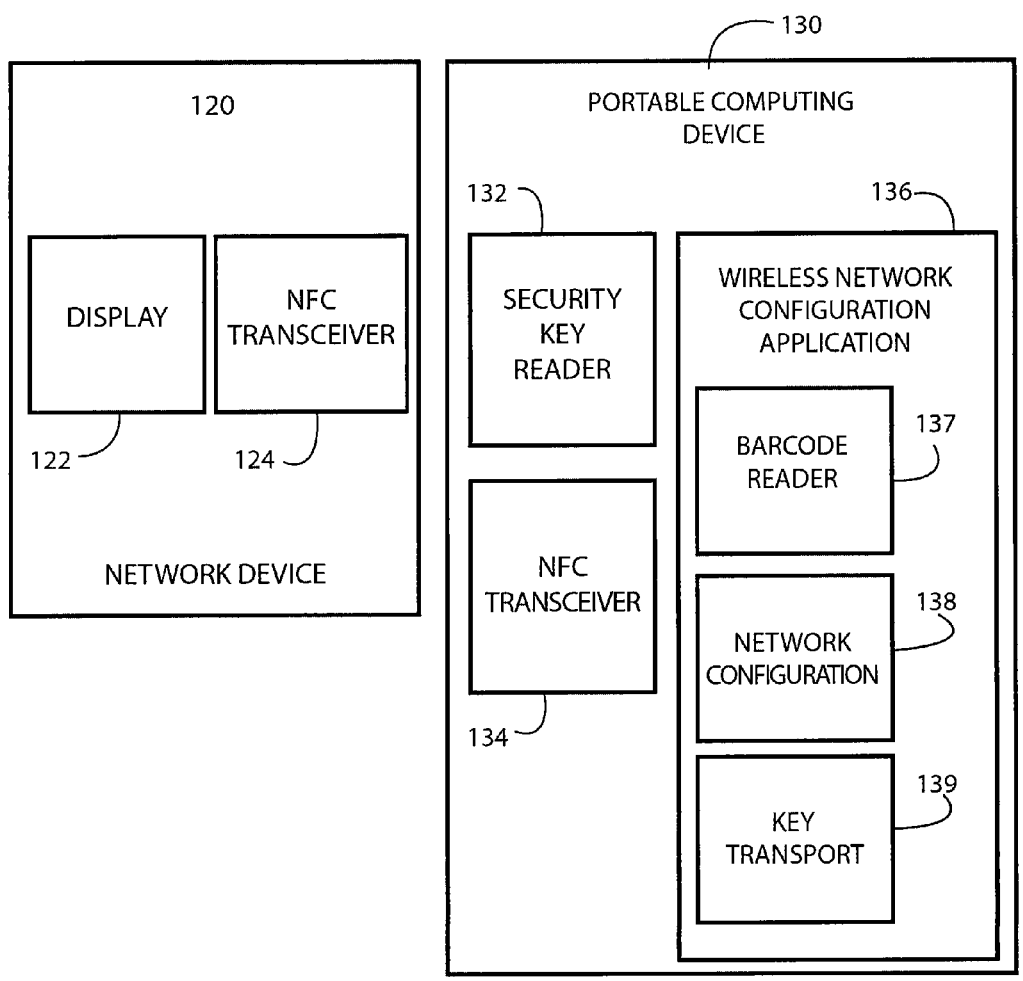
FIG. 2 illustrates an embodiment of the network device and portable computing devices of FIG. 1, shown in greater detail according to an exemplary embodiment.

Referring now to FIG. 2, network device 120 and portable computing device 130 are shown in greater detail, according to an exemplary embodiment. Although devices 120 and 130 are shown in FIG. 2 as including specific components in exemplary configurations, it is important to recognize that devices 120 and 130 may include more, fewer, and/or a different configuration of components to implement the functions described herein.

The functional components of network devices 120 and 130 may be implemented using hardware including a processing unit, a system memory, and a system bus that couples various system components, including the system memory, to the processing unit. The system bus may be any of several types of bus structures including a memory bus or a memory controller, a peripheral bus, and a local bus using any of a variety of bus architectures. Further, the described components may be implemented using hardware and/or software.

The processing unit of each device 120, 130 may be any type of computer processor configured to implement the functionality described herein including the steps of communicating wireless network configuration information including a wireless network security key between devices 120 and device 130 by displaying the wireless security key in an encrypted form using display 122 of device 120. The processing unit may be a MIPS, ARM, x86, or other processor as are known in the art or later developed.

The system memory of each device 120, 130 includes computer storage media in the form of volatile and/or non-volatile memory such as read only memory (ROM) and random access memory (RAM). A basic input/output system (BIOS), containing the basic routines that help to transfer information between elements within devices 120 and 130, such as during start-up or networking operations, is typically stored in ROM. RAM typically contains data and/or program modules that are immediately accessible to and/or presently being operated on by the processing unit. The device 120 may also include other removable/non-removable, volatile/non-volatile computer storage media, such as flash memory.

Although network device 120 may be any of a variety of types of network appliances, for clarity device 120 is further described herein with reference to a router type network appliance configured to facilitate promulgation of wireless network configuration information. In addition to including the above-described key display 122, network device 120 may further be configured to include a near field communication transmitter 124.

As discussed briefly above, network device 120 may further and/or alternatively include a near field communication transmitter 124. The near field communication transmitter may be configured to convey the same and/or complementary information to the information of display 122. For example, near field communication may be implemented in the network device 120 portable computing device 130 and/or the client. Accordingly, the transfer between components could be made using a variety of different methods including, but not limited to, 1) QR to portable computing device 130 and NFC to client device, 2) NFC to portable computing device 130 and NFC to client device, 3) NFC or QR code to portable computing device 130 and manual entry to client device, and 4) USB/Ethernet to portable computing device 130 and manual or NFC to client device.

Portable computing device 130 or "PCD" includes a security key reader 132, such as a camera, configured to receive the QR code or other code including the wireless security key displayed on display 122. Portable computing device 130 may also include a near field communication transceiver for communicating using this protocol with both network device 120 and client devices 112-118, as further described hereinbelow.

Portable computing device 130 may additionally include wireless networking configuration application 136. Application 136 may be configured to operate in conjunction with the above described hardware to perform one or more functions related to wireless network configuration. In one embodiment, application 136 is configured to include a QR code reader application 137, a network configuration application 138, and a security key transport application 139. Each application could comprise software, hardware, or a combination thereof and could be provided in stand-alone fashion or could e combined with one or more other applications.

Bar code reader application 137 is configured to receive a 2-dimensional digital image from security key reader 132 and to digitally analyze the received digital image. Where the received digital image includes a QR code, the digital analysis includes locating three distinctive squares at the corners of the image and normalizing image size, orientation, and angle of viewing. The small dots are then converted to binary numbers and validity checked with an error-correcting code. The binary number may then be analyzed to determine the security key and/or other network information integrated into the QR code.

Network configuration application 138 may perform a plurality of different wireless network tasks based on the network information received by bar code reader application 137. Alternatively, application 138 may receive the network information from another source, such as an USB memory stick or an Ethernet connection. In a first task, application 138 may use the received network information to configure the wireless network settings for the portable computing device 130. Advantageously, application 136, in communication with bar code reader application 137, may detect the wireless network capabilities of the device 130 and receive the wireless network information to facilitate successful network configuration.

According to one exemplary information, network configuration application 138 may be configured to launch a wireless network configuration user interface allowing configuration of the network device 120 based on receipt of wireless network information from reader application 137. The interface may be displayed in a web browser on the portable computing device 130. The interface displayed may be a standard router interface that would have typically been displayed in a web browser of computer connected to network device 120 based upon entry of the network device's IP number, such as 192.168.1.1. Using the interface described herein, the IP number interface may be disabled in favor of the QR code-initiated interface to increase network security. Without this disabling, a user, such a person driving past a home having a wireless network or a customer in a business offering a hotspot to its customers, may be able to access a router configuration page based upon receipt of a wireless signal. However, using the QR code initiated interface, only a user having direct access to a network device can access a configuration page for that network device.

Portable computing device 130 may additionally have a security key transport application 139 that can be used to securely communicate security key information between network device 120 and one or more client devices, such as any or all of the device 112-118 shown in FIG. 1. As with the other applications, this application may be implemented via hardware, software, or a combination of both and may be modular or integrated with one or more applications. Using this security key transport application, portable computing device 130 may be used to convey security key information from a router or other network device to stationary computing devices, such as a large screen television having networking capabilities, without requiring close proximity between the devices and without requiring the user to write down the security key or even without ever providing the security key in a user readable format.

Using a first method, transport application 139 is configured to receive wireless network information from application 137 or another source and display the information on a display of the portable computing device 130. For example, where device 130 is a smartphone, a user uses an integrated camera to capture a QR code image that is interpreted by application 138 to display a wireless security key on the display of device 130 such that the security key does not need to be written down by the user. The user can then carry device 130 to a client device and type in the wireless security key from the display. Transport application 139 may be configured such that the security key will only be displayed for a limited amount of time and will be deleted from memory thereafter to increase security for the wireless network.

According to an alternative embodiment, transport application 139 may be configured such that the security key need not be displayed by the portable computing device 120 in a humanly discernible manner. For example, transport application 139 may be configured to generate a display of a QR code or other indicia that may be scanned by a client device to convey the security key or other network information without ever directly displaying that network information. Alternatively, transport application 139 may utilize the NFC transceiver 134 to transmit the security key to a NFC receiver of a client device without ever using the display of device 130.

Figure 3:
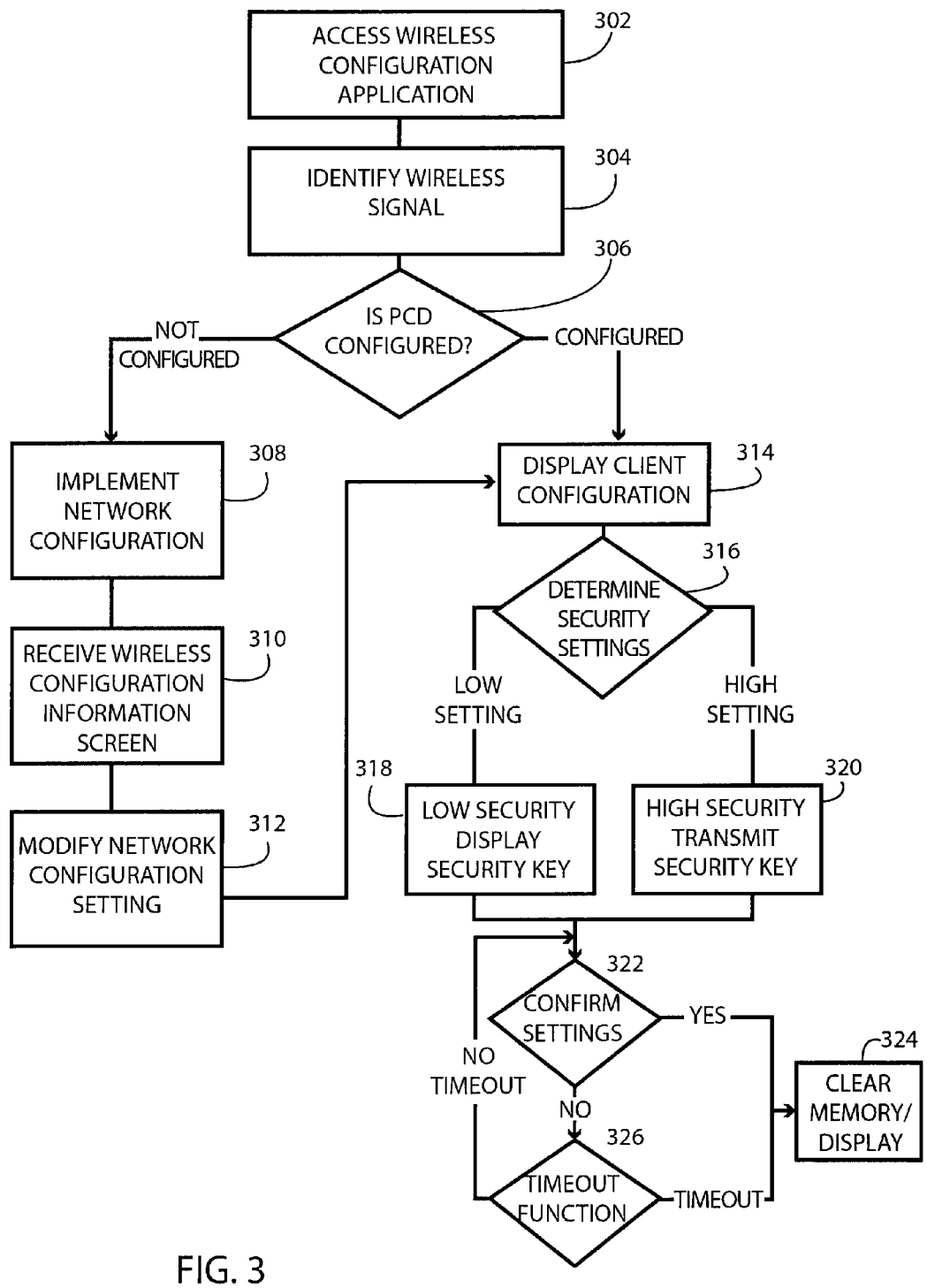
FIG. 3 is a flowchart illustrating a method for configuring one or more devices in a wireless network using a security key displayed by a network device, according to an exemplary embodiment.

Referring now to FIG. 3, a flowchart 300 illustrating an exemplary method for configuring one or more devices in a wireless network using a security key displayed by a network device is shown, according to an exemplary embodiment. The method of flowchart 300 may be implemented using portable computing device 130 in combination with network device 120.

In a first step 302, a user can access wireless configuration application 136, resident in memory of the portable computing device 130, to initiate a wireless communication configuration method with a network device 120. In a step 304, the application searches for a wireless signal transmitted by network device 120. When the signal is found, device 130 determines whether its network configuration settings, including the wireless security key, are configured to allow communication through network device 120 using the wireless signal in a step 306.

If portable computing device 130 is not configured to communicate through network device 120, application 136 may be configured to implement the network configuration application 136, described above with reference to FIG. 2, in a step 308. Application 136 is configured to display instructions to the user to scan information displayed by network device 120, that information is a QR code in this example. The scanned QR code may be analyzed and interpreted by QR code reader application 137 in a step 310 to receive at least a wireless security key and possibly additional wireless configuration information specific to network device 120 and/or the wireless signal transmitted by network device 120. In a step 312, portable computing device 130 is configured to modify one or more wireless network settings for device 130 based on the information received in step 310 to initiate wireless communication through network device 120.

If it is determined in step 306 that the portable computing device 130 is already configured to communicate through network device 120, or following configuration of device 130 in step 312, device 130 may display a client configuration screen allowing the user to configure one or more client devices in a step 314. In a step 316, the determination of the security settings for application 136 is made to determine how to communication a wireless security key to a client device. In a low-security environment and/or in an environment requiring manual entry of the security key into the client device, device 130 may be configured to display a wireless security key that can be manually entered into a keypad or other input device of the client device by a user in a step 318.

In order to provide more secure communication of the wireless security key, if the client device is capable of receiving wireless signals from the portable computing device 130, device 130 may be configured to display instructions prompting the user to place device 130 in close proximity to the client computing device such that the client computing device can receive wireless security or other networking information using at least one of near field communication and displaying a QR code on the display of device 134 capture by a QR code scanner of the client computing device in a step 320. Alternatively, device 130 may be configured to require entry of a sign-in password that is also associated with network device 120.

According to another alternative embodiment, computing device 130 may be registered with a cloud based portal when the wireless network configuration software is installed. The cloud based portal can receive device details as well as the encrypted security key. Thereafter, in order to display or otherwise transfer the wireless network information using device 130, the user must sign into their portal to enable the display. Advantageously, using this method adds a layer of password protection specific to device 130, tying the security key read by device 130 back to the device 130 as a validation without specifically displaying the information.

In a step 322, portable computing device 130 determine whether the client device was successful configured based on feedback from one or more of a network device 120, and one or more client computing devices indicative of successful wireless network configuration. Based on receipt of the feedback, device 130 may clear wireless security key and other wireless network information from the memory of device 130 in a step 324. Alternatively, even without receiving such confirmation, in a step 326, device 130 may be configured to clear the wireless security key and other wireless network information from the memory of device 130 in step 324 based on expiration of a timer regardless of whether feedback has been received. If the timeout function has not elapsed, device 130 can continue searching for either confirmation and/or lapse of the timeout function in a loop of steps 322 and 326.

Advantageously, portable computing device 130 can convey wireless configuration information from a network device 120 to one or more client devices, such as one or more of devices 112-118. The wireless configuration information can include a wireless security key allowing users of devices 112-118 to communicate wirelessly through network device 120 with an external network 140, such as the Internet. Device 130 thus may be used to convey wireless network information without requiring the user to write down potentially sensitive information such as the wireless security key. Further, in at least one embodiment, wireless security information may be promulgated to any or all of a plurality of client devices without ever displaying the wireless security information in an unencrypted form.

Certain terminology is used herein for purposes of reference only, and thus is not intended to be limiting. For example, terms such as "network device" refer to any system receiving and retransmitting information packets in a computer network. Examples can include a network router, a network switch, a wireless access point, a gateway router, etc.

References to "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A portable computing device for configuring wireless network settings based on received wireless network-information, comprising:

an input device configured to receive wireless network information directly from a network device generating a wireless network to facilitate communication with a plurality of peripheral devices that are client devices to the network device, the wireless network information including information to facilitate configuration of a client device to communicate on the wireless network through the network device, wherein the input device can receive the wireless network information without communicating on the wireless network that is generated by the network device;

a network configuration application for configuring one or more wireless network settings to initiate wireless network communication through the network device based on the received wireless network information; and an output device configured to communicate the one or more wireless network setting to at least one of the client devices, wherein the network configuration application is configured to facilitate communication of the received wireless network information to the client device.

2. The device of claim 1, wherein the input device is a camera used in combination with barcode interpretation software.

3. The device of claim 1, wherein the input device is a near field communication transceiver.

4. The device of claim 1, wherein the network configuration application is configured to facilitate communication of the received wireless network information to the client device using the near field communication transceiver.

5. The device of claim 4, wherein the network configuration application is configured to receive a network configuration confirmation from at least one of the network device and the client device based on the transmittal of the wireless network information to the client computing device.

6. The device of claim 1, wherein the network configuration application is configured to facilitate communication of the received wireless network information to the client device by displaying a wireless security key on a display of the portable computing device.

7. The device of claim 6, wherein the network configuration application is configured to delete the wireless security key from the display and from a memory of the portable computing device based on expiration of a timer.

8. A computer-implemented method, implemented by an application stored in non-transitory memory of a portable computing device, for configuring wireless network settings based on received wireless network information, comprising:

receiving wireless network information from a network device generating a wireless network to facilitate communication with a plurality of peripheral devices that are client devices to the network device, the wireless network information including information to facilitate configuration of a client device to communicate on the wireless network through the network device, wherein the wireless network information is received without communicating on the wireless network implemented by the network device;

configuring one or more wireless network settings to initiate wireless network communication through the network device based on the received wireless network information; and transmitting the received wireless network information to at least one of the client devices using the near field communication transceiver.

9. The method of claim 8, wherein receiving wireless network information from a network device includes activating a camera of the portable computing device to receive a bar code.

10. The method of claim 8, wherein receiving wireless network information from a network device includes receiving a signal on a near field communication transceiver of the portable computing device.

11. The method of claim 8, further including receiving a network configuration confirmation from at least one of the network device and the client computing device based on the transmittal of the wireless network information to the client device.

12. The method of claim 8, further including displaying a wireless security key on a display of the portable computing device.

13. The method of claim 12, further including deleting the wireless security key from the display and from a memory of the portable computing device based on expiration of a timer.

14. A portable computing device for configuring wireless network settings based on received network configuration information, comprising:

a bar code reader configured to read a bar code displayed on a network device generating a wireless network to facilitate communication with a plurality of peripheral devices that are client devices to the network device using a camera of the portable computing device, the bar code including an encrypted wireless security key; and a network configuration application for configuring one or more wireless network settings, including setting the received wireless security key, wherein the network configuration application is configured to facilitate communication of the received wireless security key to at least one of the client devices.

15. The device of claim 14, further including a near field communication transceiver, wherein the network configuration application is configured to facilitate communication of the received wireless security key to a client device by transmitting the wireless security key using the near field communication transceiver.

16. The device of claim 15, wherein the network configuration application is configured to receive a network configuration confirmation from at least one of the network device and the client device based on the transmittal of the wireless security key to the client computing device.

17. The device of claim 14, wherein the network configuration application is configured to facilitate communication of the received wireless security key by displaying the wireless security key on a display of the portable computing device.

18. The device of claim 17, wherein the network configuration application is configured to delete the wireless security key from the display and from a memory of the portable computing device based on expiration of a timer.

19. The device of claim 14, wherein the network configuration application is configured to display a user interface for configuring one or more wireless network settings of the network device based on the received bar code.

* * * * *